United States Patent [19]

Schwetz et al.

[11] Patent Number: 5,503,519
[45] Date of Patent: Apr. 2, 1996

[54] APPARATUS FOR LOADING PLATE-SHAPED ARTICLES

[76] Inventors: Anton Schwetz, Norning 72, A-8273 Ebersdorf; Rudolf Russow, Kleinstubing 180, A-8114 Stubing; Mihail Lupu, Purgstall 291, A-8063 Eggersdorf, all of Austria

[21] Appl. No.: 182,337

[22] Filed: Jan. 18, 1994

[30] Foreign Application Priority Data

Jan. 25, 1993 [AT] Austria .......... 110/93

[51] Int. Cl.⁶ .................. B65G 59/04
[52] U.S. Cl. .......... 414/798.9; 271/31.1; 271/94; 414/732; 414/737
[58] Field of Search ............ 271/31.1, 94; 414/732, 414/737, 798.9

[56] References Cited

U.S. PATENT DOCUMENTS

| | | |
|---|---|---|
| 3,041,068 | 6/1962 | Schaltegger . |
| 4,518,301 | 5/1985 | Greenwell .......... 271/31.1 X |
| 5,230,502 | 7/1993 | Plenzler et al. .......... 271/94 X |

FOREIGN PATENT DOCUMENTS

| | | |
|---|---|---|
| 379565 | 1/1986 | Austria . |
| 387294 | 12/1988 | Austria . |
| 0141806 | 5/1985 | European Pat. Off. . |
| 1581764 | 12/1980 | United Kingdom . |
| 2104280 | 3/1983 | United Kingdom . |
| WO92/01619 | 2/1992 | WIPO . |

Primary Examiner—Michael S. Huppert
Assistant Examiner—Janice L. Krizek
Attorney, Agent, or Firm—Young & Thompson

[57] ABSTRACT

An apparatus (10) for loading plates (3) from a stack (2) and for depositing the plates (3) on a conveyor comprises two alternatingly effective grippers (30, 31). The grippers (30, 31) are moved alternately into a loading position seizing the first accumulator plate (3) of the stack (2) and into a delivery position associated with the conveyor. The grippers (30, 31) are supported on levers (13, 14) which latter are mounted to be swivelable on the apparatus. Each gripper (30, 31) is supported to be rotatable by 360° on its lever (13, 14) about an axis of rotation (34) parallel to the swivel axis (12) of the lever, and is rotated in only one direction by a drive mechanism (42, 40). In order to improve the seizing of a plate (3), the grippers (30, 31) are at a standstill with respect to the levers (13, 14) carrying such grippers when they are in their swiveling position corresponding to the loading position. Due to the fact that the grippers (30, 31) execute a rotational movement, the frequency of removal of plates (3) from the stack (2) can be increased without any problems.

7 Claims, 4 Drawing Sheets

FIG. I

APPARATUS FOR LOADING PLATE-SHAPED ARTICLES

FIELD OF THE INVENTION

The invention relates to an apparatus for loading plate-shaped articles, especially accumulator plates, removed from a stack of such articles, and for depositing the articles on a conveyor, with a gripper seizing respectively one article, this gripper having preferably at least one suction cup that can be placed under a vacuum and being movable to and fro between a loading position seizing the first article of the stack and a delivery position associated with the conveyor, wherein the gripper is supported on a lever which latter is mounted to be swivelable in the apparatus.

BACKGROUND OF THE INVENTION

Such an apparatus has been known, for example, from EP-B 141,806.

In the conventional devices, the frequency at which individual plates can be removed from the stack is limited since a reciprocating swiveling motion is executed not only by the levers carrying the gripper but also by the gripper proper when the respectively foremost plate is withdrawn from the stack and moved to a conveying means.

SUMMARY OF THE INVENTION

The invention is based on the object of further developing the apparatus of the type discussed above so that the frequency at which the plates can be removed from the stack can be higher than heretofore.

This object has been attained by the invention in that the gripper is supported on the lever to be rotatable by 360° about an axis of rotation parallel to its swivel axis, and that a drive mechanism is associated with the gripper for rotation in only a single direction of rotation.

Thanks to fashioning the apparatus in accordance with this invention, the gripper executes a rotary motion with respect to the lever carrying the gripper, so that the latter need no longer be moved to and fro with regard to the lever carrying the gripper, as was the case heretofore.

Another advantage of the apparatus according to the invention resides in that the reciprocating movement of the lever carrying the gripper and the rotary motion of the gripper relative to the lever are superimposed on each other so that, in total, a uniform cycle of movements is achieved.

In one embodiment of the invention, the provision can be made that the gripper is at a standstill with respect to the lever carrying same when the latter is in its swivel position corresponding to the loading position. In this embodiment, the gripper is stationary in the loading position, i.e. it does not perform a rotary movement at the instant of reversal of motion of the lever carrying the gripper, corresponding to the instant at which the lever is in its position corresponding to the loading position. Thereby, the transfer and/or the seizure of the foremost plate of the stack takes place while the gripper is at a standstill, and thus in a secure fashion.

This nonuniform rotary motion of the gripper, which, however, always takes place in the same direction, with respect to the lever rotating the gripper can be achieved by a combination of a clutch with a brake or, alternatively, by an electronic control of the movement of the gripper with respect to the lever carrying same. It is, however, especially preferred within the scope of the invention that the drive mechanism rotates the gripper in a nonuniform motion, and that the rotary speed of the gripper with respect to the lever carrying the same is reduced during approach to the loading position of the gripper and is decreased preferably to zero in the loading position.

The concept of the apparatus in accordance with this invention also permits an embodiment distinguished in that two levers are provided supported to be swivelable about the same axis, and that each lever carries a gripper, wherein both grippers can be moved into the same unloading position and into the same delivery position. Thereby, the frequency of transfer of plate-shaped articles from the magazine to the conveyor can be doubled without increasing the frequency of the movement of the levers carrying the grippers.

In a practical embodiment of the apparatus according to this invention, the provision is made that the levers execute oppositely directed swiveling motions, and that one of the levers is in the loading position when the other lever approaches the delivery position, and vice versa. In this connection, a crank drive mechanism is preferably included for the to and fro movement of the levers.

In this embodiment, the rotary drive mechanism for the movement of the grippers with respect to the levers carrying the same is designed so that the grippers on the levers in all cases point in differing, preferably in opposite directions. This ensures that the two grippers will not interfere with each other during their movements.

Preferably a stepping gear mechanism is provided within the scope of this invention for driving the gripper or grippers, this mechanism being coupled with a drive shaft arranged coaxially to the swivel axis of the lever or levers, and the gripper, or both grippers, for rotating same, is or are coupled with this one drive shaft.

In this way, it is ensured with simple means that the motions of the grippers with respect to the levers carrying same are synchronized.

In this connection, it is preferred that a drive gear or drive gears is or are attached to the drive shaft, this gear or these gears being coupled with one or, respectively, two drive stub axles of the gripper or grippers. This embodiment has the advantage that the drive mechanism for the grippers for executing their rotary motions with respect to the levers carrying same will not impede or adversely affect the movements of the levers themselves.

This embodiment also permits a further development of the invention in the direction that the drive stub axles of the grippers freely project from the levers carrying the grippers and point toward one another; that the grippers as seen from the side are essentially of an L-shaped design wherein each gripper, especially its part carrying the suction cup provided thereon, overlaps the drive stub axle of the other gripper; and that both grippers move along the same path of travel. This results in a compact structure of the apparatus according to the invention wherein the grippers yet move along identical travel paths.

The apparatus according to this invention is also distinguished in that entraining means traveling in the conveying direction are provided for pushing plate-shaped articles away from the gripper which is in the delivery position onto the beginning of the conveyor. This feature reliably performs the transfer of plate-shaped articles from the gripper in the delivery position to the conveying means.

In order to synchronize the movement of the entraining means pushing the plate-shaped articles from the gripper onto the conveyor with the movement of the grippers, the provision can be made within the scope of this invention that the entraining means are attached to at least one endless conveying member revolving over drive and guide wheels, wherein the drive wheels are coupled with the drive shaft for the rotation of the grippers.

In case the apparatus according to this invention comprises, as the drive stub axles, tubular sections placed over hollow stub axle, wherein the vacuum for the suction cup of the gripper is applied via the drive stub axle, the stub axle, and the lever of hollow design, there being holes in the drive stub axle and in the stub axle which holes cover and/or overlap one another when the gripper moves from the loading position to the delivery position, then the provision can be made that the connection of the gripper with the vacuum source is interrupted shortly before the gripper has reached the loading position. This feature has the advantage, especially when using the apparatus of this invention for the removal of air-permeable articles, such as accumulator plates, that the vacuum by means of which the plate is retained on the gripper or its suction cup is diminished until the entrainment means pushes the plate onto the conveyor, so that this motion can take place without any problems.

BRIEF DESCRIPTION OF THE DRAWINGS

Further details and features of the invention can be seen from the following description of a preferred embodiment of the apparatus according to the invention wherein reference is had to the appended drawings wherein.

DETAILED DESCRIPTION OF THE INVENTION

Figure 1:
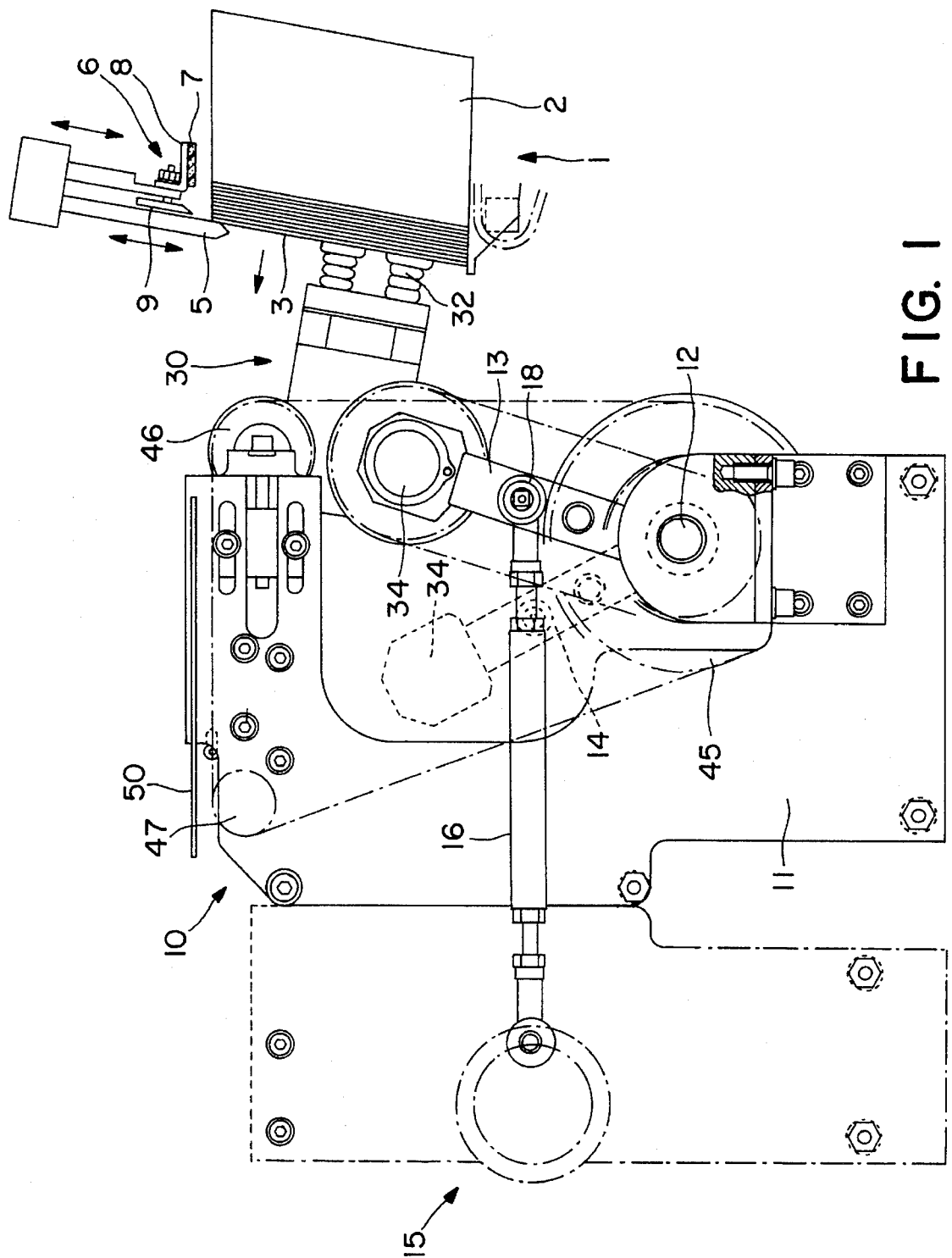
FIG. 1 shows an apparatus in a lateral view.
Figure 3:
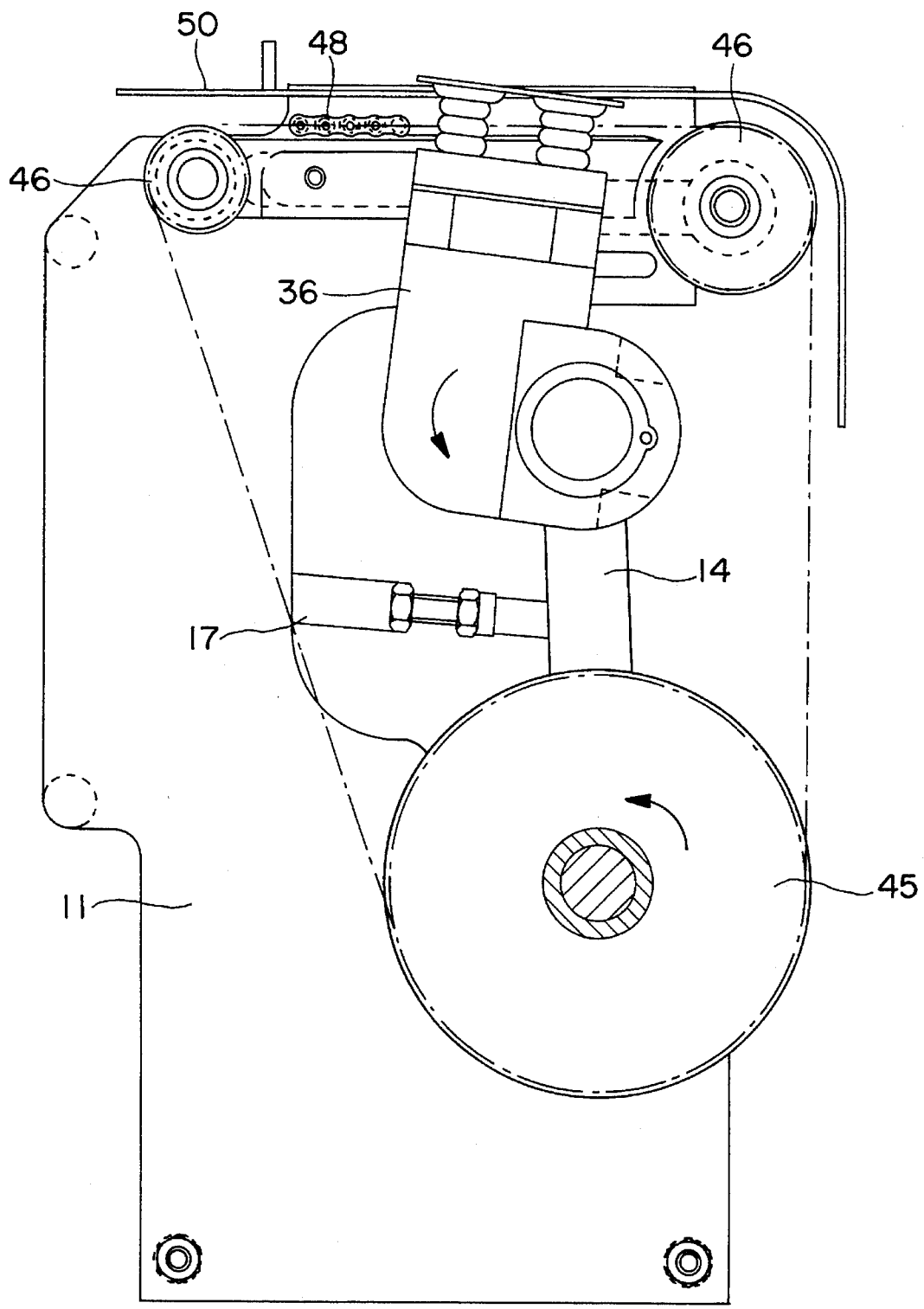
FIG. 3 shows the apparatus in a section along line AA in FIG. 2.

As shown in FIG. 1, the apparatus for unloading plate-shaped articles—these being accumulator plates in the illustrated embodiment—is associated with the delivery end of a magazine 1 which can be designed as disclosed in Austrian Patent 379,565, Austrian Patent 387,294, or EP-B 141,806, and which contains a stack 2 of accumulator plates 3. The hold-down means at the unloading end of the magazine 1 is designed as illustrated in FIG. 3 of EP-B 141,806, the hold-down means 6 provided beside the stop 5 having a hold-down plate 8 contacting the stack 2 from above and provided with a foam lining 7; by means of a blade 9, the hold-down means engages between the foremost and the subsequent plates 3. The stop 5 and the hold-down means 6 can be shifted up and down in alternating fashion by pressure medium motors as described in EP-B 141,806.

Figure 4:
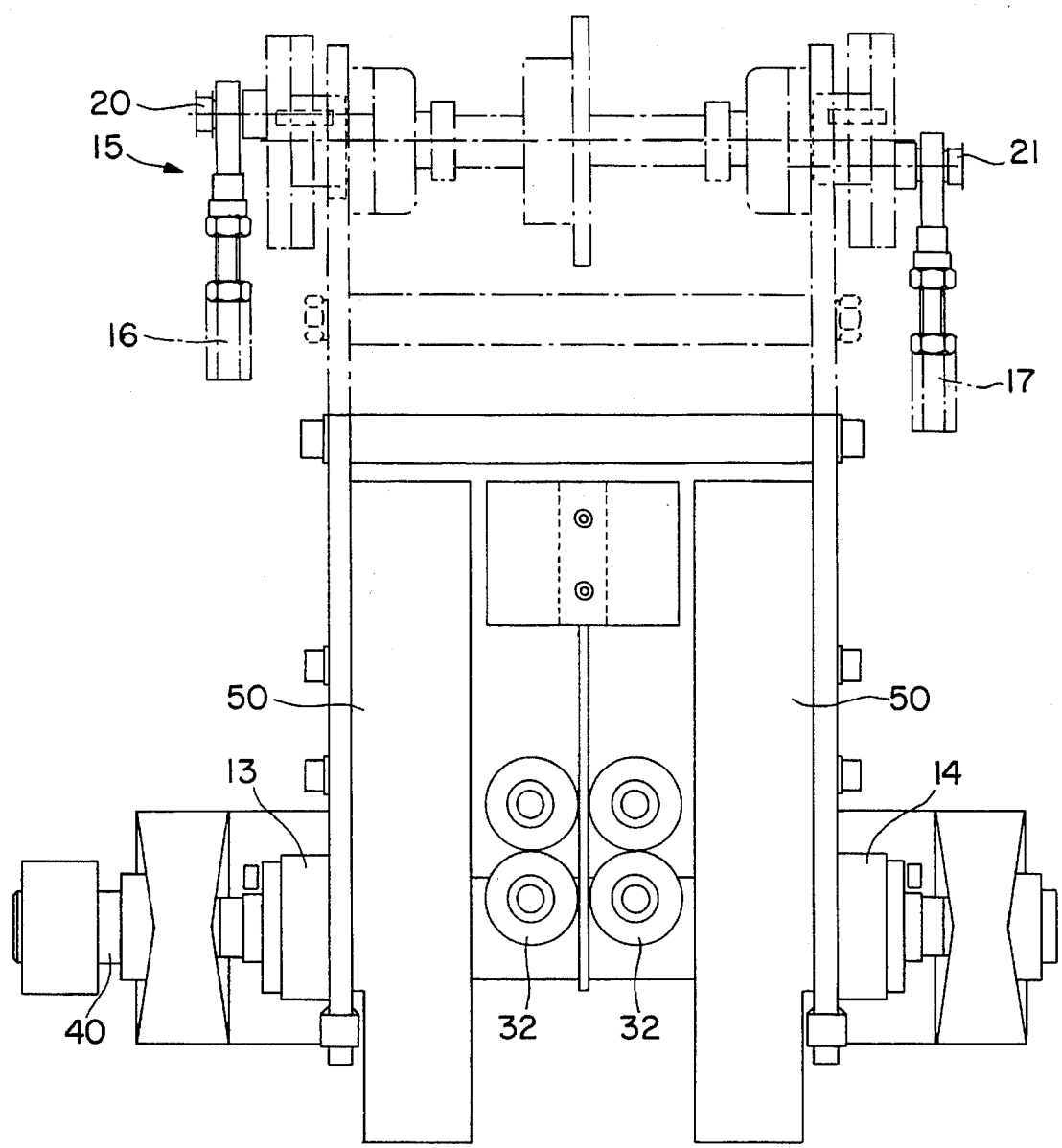
FIG. 4 is a top view of the apparatus according to this invention.

The loading device 10 comprises a machine frame 11 wherein two levers 13 and 14 are supported to be swivelable about a horizontal axis 12. A crank drive mechanism 15 is provided for driving the levers 13 and 14, this mechanism being coupled via push rods 16 and 17 with the levers 13 and 14. The push rods 16 and 17 are connected to pivot pins 18 of the levers 13 and 14. As shown especially in FIG. 4, the crank pins 20, 21 of the crank drive mechanism 15 are offset with respect to each other so that the levers 13 and 14 execute a phase-shifted swiveling motion about their swivel axis 12.

Each lever 13 and 14 carries at its free end a gripper 30 and 31, respectively, wherein each gripper 30, 31 is equipped with four suction cups 32.

The grippers 30 and 31 are supported on stub axles 33 mounted to the levers 13 and 14 to be rotatable about axes 34 in parallel to the swivel axis 12 of the levers 13 and 14. For this purpose, the grippers 30 and 31 each have a drive stub axle 35 which, in the illustrated embodiment, is designed to be integral with the gripper body 36 carrying the suction cups 32, this gripper body being designed essentially to be of an L shape.

The drive mechanism for rotating each of the two grippers 30 and 31 with respect to the levers 13 and 14 consists in the illustrated embodiment of a toothed belt pulley 37 connected to the drive stub axle 35, a toothed belt 38 connecting the toothed belt pulley 37 with a further toothed belt pulley 39. The further toothed belt pulleys 39 of the rotary drive mechanisms for the two grippers 30 and 31 are connected with a drive shaft 40 which latter simultaneously constitutes the bearing axle for the levers 13 and 14. The drive shaft 40 is driven by a stepping gear mechanism 42 via a toothed belt or a roller chain drive means 41.

Roller chain drives can also be provided for rotating the grippers 30 and 31, instead of the toothed belt drives.

Furthermore, two gear wheels 45 are attached to the drive shaft 40. An endless roller chain 48 to which dogs 49 are attached travels over the gear wheels 45 and two further guide wheels 46 and 47 which latter are mounted in the machine frame 11. Sliding plates 50 are mounted at the top in the machine frame 11; these sliding plates lead to a conveyor extending perpendicularly to the plane of illustration of FIG. 1 and not shown in the drawings. The accumulator plates 3 withdrawn from the stack 2 are carried away by means of this conveyor.

The suction cups 32 of the grippers 30 and 31 are exposed to a vacuum by way of conduits 60 leading to a vacuum source and terminating in the levers 13 and 14 which latter are designed to be hollow. A cavity 62 in the axle stubs 33 is in communication with the cavity 61 in the levers 13 and 14. This cavity 62, in turn is (intermittently) in communication with the cavity 63 in the bodies 36 of the grippers 30 and 31, respectively. The connection of the cavities 62 and 63 is established by way of an opening 64 provided in the axle stub 33, this opening 64 being in communication with the cavity 63 in the body 36 of the grippers 30 and 31 only when the gripper 30 or 31 moves from the unloading position shown in FIG. 1 into the delivery position shown in FIG. 3. The arrangement of the opening 64 is such herein that the cavity 63 in the body 36 of the grippers 30 and 31 is blocked off from the cavity 62 in the axle stub 33 when the gripper 30, 31 is shortly before the unloading position illustrated in FIG. 3. In this way, the vacuum in the cavity 63 and in the suction cups 32 of grippers 30 and 31 can diminish until the final attainment of the delivery position (accumulator plates are air-permeable), so that the accumulator plate 3 can be pushed without problems by the entraining means 49 from the suction cups 32 onto the sliding plates 50 and can be moved further along the latter to the beginning of the conveyor.

The opening 64 furthermore is oriented so that the suction cups 32 of the grippers 30 and 31 are placed under a vacuum when in the loading position shown in FIG. 1 (or shortly before).

Figure 2:
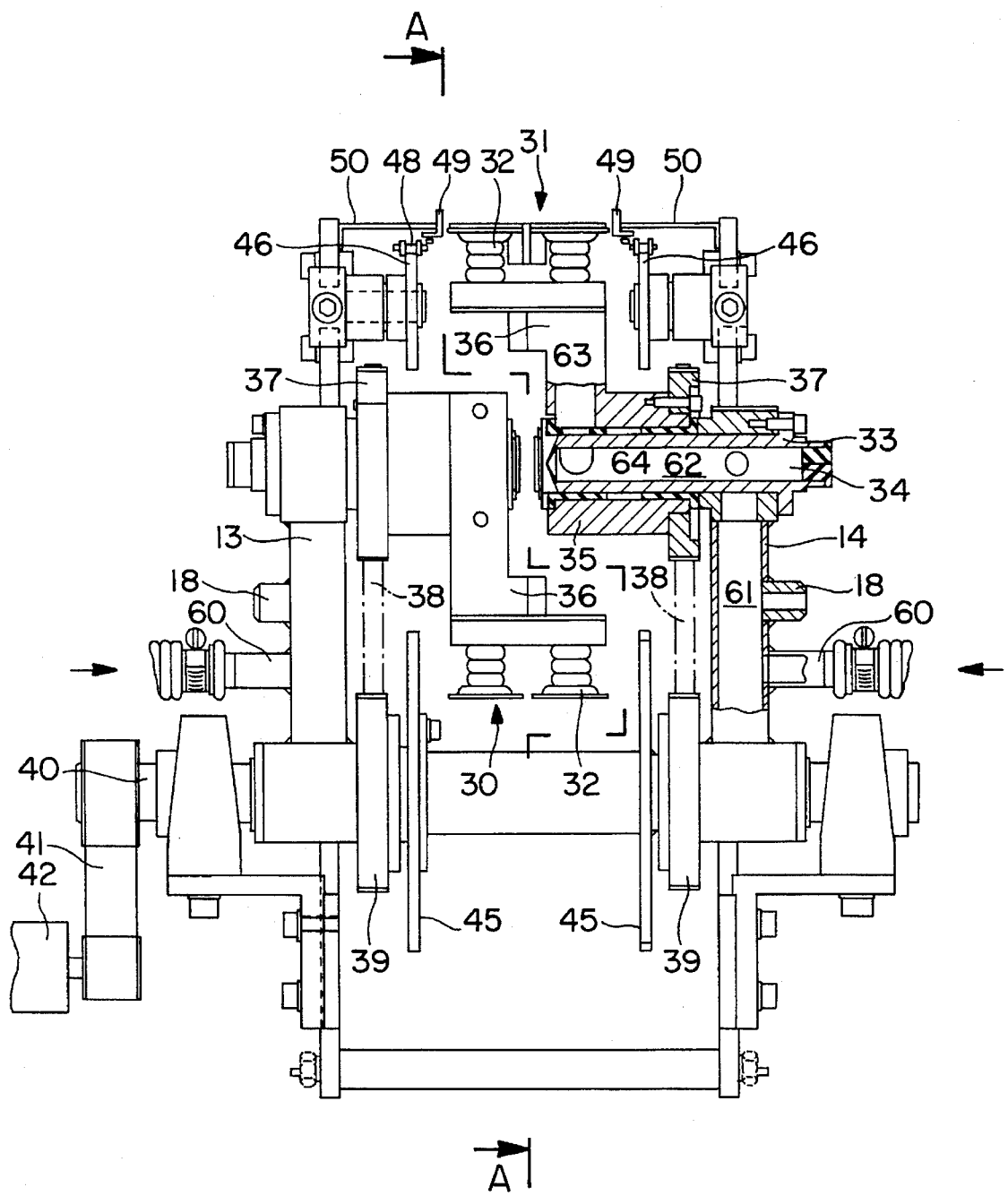
FIG. 2 shows the apparatus as seen from the right of FIG. 1.

As illustrated in FIG. 2, the two grippers 30 and 31 move in one and the same path of movement without impeding each other since they, or their bodies 36, are designed to be angled, and the axle stubs 33, projecting freely from the two levers 13 and 14, point toward each other.

The dogs 49 on the roller chains 48 are arranged so that they are always shortly in front of a gripper 30 or 31 in the delivery position and engage an accumulator plate 3 immediately after the latter has been deposited on the sliding plates 50. Synchronization of the movements of the two grippers 30 and 31 with the dogs 49 is ensured by driving the roller chains 48 carrying the dogs 49 by the drive shaft 40 via the gear wheels 45, this shaft also driving the grippers 30 and 31.

The stepping gear mechanism 42 is designed so that the rotary motion of the grippers 30 and 31 with respect to the levers 13 and 14 always takes place in the same direction wherein, however, the speed of the rotary motion of the grippers 30 and 31 is reduced, preferably to zero, shortly before reaching the loading position shown in FIG. 1, so that the grippers 30 and 31 are in each case arrested when they remove an accumulator plate 3 from the stack 2 of the magazine 1 (at this instant, the stop 5 is pulled up and the hold-down plate is lowered onto the stack 2).

Synchronizing of the to and fro motions (swiveling movement) of the two levers 13 and 14 with the rotary motion of the grippers 30 and 31 and thus also with the movements of the roller chains 48 carrying the dogs 49 can be obtained in a simple way by driving the stepping gear mechanism 42 and the crank drive mechanism 15 from a joint primary drive unit.

In summation, the invention can be described, for example, as follows:

An apparatus 10 for removing accumulator plates 3 one by one from a stack 2 and for depositing the accumulator plates 3 on a conveyor comprises two alternatingly effective grippers 30, 31. The grippers 30, 31 are moved alternatingly into a loading position seizing the first accumulator plate 3 of the stack 2 and into a delivery position associated with the conveyor. The grippers 30, 31 are supported on levers 13, 14 which latter are mounted to be swivelable in the apparatus. Each gripper 30, 31 is supported to be rotatable by 360° on its lever 13, 14 about an axis of rotation 34 parallel to the swivel axis 12 of the lever, and is rotated in one direction by means of a drive mechanism 42, 40. In order to improve the seizing of an accumulator plate 3, the grippers 30, 31 are at a standstill with respect to the levers 13, 14 carrying such grippers when they are in their swiveling position corresponding to the loading position. Due to the fact that the grippers 30, 31 execute a rotational movement, the frequency of removal of accumulator plates 3 from the stack 2 can be increased without any problems.

What is claimed is:

1. In an apparatus (10) for unloading plate-shaped articles (3), from a stack (2) of such articles (3), and for depositing the articles (3) on a conveyor, comprising a gripper (30, 31) for seizing one article, said gripper having at least one suction cup (32) thereon that can be placed under vacuum, said gripper being movable between a loading position seizing the first article (3) of the stack (2) and a delivery position associated with the conveyor; the improvement wherein the gripper (30, 31) is supported on a lever (13, 14) mounted to be swivelable on the apparatus, the gripper (30, 31) being supported on the lever (13, 14) to be rotatable by 360° about an axis of rotation (34) parallel to a swivel axis (12) of the lever (13, 14), and a drive mechanism (42, 40) for rotating the gripper (30, 31) in only one direction of rotation about said axis of rotation (34), wherein two levers (13, 14) are provided which are supported to be swivelable about the swivel axis (12), and each lever (13, 14) carries a gripper (30, 31), both grippers being movable between a loading position and a delivery position, and wherein the levers (13, 14) execute oppositely directed swiveling motions, and one of the levers (13, 14) approaches the loading position when the other lever (13, 14) is in the delivery position, and vice versa.

2. Apparatus according to claim 1, wherein a crank drive mechanism (15, 16, 17) swivels the levers (13, 14).

3. Apparatus according to claim 1, wherein the grippers (30, 31) on the levers (13, 14) point in different directions.

4. Apparatus according to claim 1, wherein said drive mechanism includes a stepping gear mechanism (42) for driving the gripper (30, 31), said stepping gear mechanism being coupled with a drive shaft (40), the drive shaft (40) being arranged coaxially to the swivel axis (12) of the lever (13, 14), and the gripper (30, 31) being coupled for rotation with said drive shaft (40).

5. Apparatus according to claim 1, further comprising entrainment means (49) moving in a conveying direction for pushing plate-shaped articles (3) away from the gripper (30, 31), which is in the delivery position, onto one end of the conveyor.

6. In an apparatus (10) for unloading plate-shaped articles (3), from a stack (2) of such articles (3), and for depositing the articles (3) on a conveyor, comprising a gripper (30, 31) for seizing one article, said gripper having at least one suction cup (32) thereon that can be placed under vacuum, said gripper being movable between a loading position seizing the first article (3) of the stack (2) and a delivery position associated with the conveyor; the improvement wherein the gripper (30, 31) is supported on a lever (13, 14) mounted to be swivelable on the apparatus, the gripper (30, 31) being supported on the lever (13, 14) to be rotatable by 360° about an axis of rotation (34) parallel to a swivel axis (12) of the lever (13, 14), and a drive mechanism (42, 40) for rotating the gripper (30, 31) in only one direction of rotation about said axis of rotation (34), wherein two levers are provided and wherein a drive stub axle (35) freely projects from each of the levers (13, 14), each drive stub axle carrying a gripper, the drive stub axles (35) pointing toward each other, the grippers (30, 31), as seen from one side, being L-shaped, each gripper (30, 31) overlapping the drive stub axle (35) of the other gripper (30, 31), said drive stub axles (35) being tubular sections which are placed over hollow axle stubs (33), wherein the suction cup (32) of the gripper (30, 31) is exposed to a vacuum by way of the drive stub axle (35), the axle stub (33) and the lever (13, 14) being hollow, holes (64) being provided in the drive stub axle (35) and in the axle stub (33) which holes overlap one another when the gripper (30, 31) moves from a loading position to a delivery position, and wherein the connection of the gripper (30, 31) with the vacuum source is interrupted shortly before the gripper (30, 31) has reached the delivery position, said drive mechanism (42, 40) including a drive shaft (40) and a drive gear (39) coupled with at least one said drive stub axle (35) to rotate said at least one drive stub axle and hence said gripper (30, 31) on said drive stub axle (35).

7. In an apparatus (10) for unloading plate-shaped articles (3), from a stack (2) of such articles (3), and for depositing the articles (3) on a conveyor, comprising a gripper (30, 31) for seizing one article, said gripper having at least one suction cup (32) thereon that can be placed under vacuum, said gripper being movable between a loading position seizing the first article (3) of the stack (2) and a delivery position associated with the conveyor; the improvement wherein the gripper (30, 31) is supported on a lever (13, 14)

mounted to be swivelable on the apparatus, the gripper (30, 31) being supported on the lever (13, 14) to be rotatable by 360° about an axis of rotation (34) parallel to a swivel axis (12) of the lever (13, 14), and a drive mechanism (42, 40) for rotating the gripper (30, 31) in only one direction of rotation about said axis of rotation (34), further comprising entrainment means (49) moving in a conveying direction for pushing plate-shaped articles (3) away from the gripper (30, 31), which is in the delivery position, onto one end of the conveyor, wherein the entrainment means (49) are attached to at least one endless conveying member (48) rotating over drive and guide wheels (45, 46, 47), and wherein the drive wheels (45) are coupled with a drive shaft (40) of the drive mechanism.

* * * * *